United States Patent
Hwang et al.

(10) Patent No.: US 7,593,113 B2
(45) Date of Patent: *Sep. 22, 2009

(54) LARGE AREAS UNDISTORTED IMAGING APPARATUS FOR LIGHT SPECKLES AND METHOD THEREOF

(75) Inventors: Yi-Yuh Hwang, Taoyuan (TW); Ming Chen, Tao-Yuan (TW); Mau-Ran Wang, Taipei (TW); Wen-Chen Huang, Taipei (TW); Shin-I Ma, Tao-Yuan (TW); Chin-Der Hwang, Jhubei (TW); Guang-Sheen Liu, Longtan Township, Taoyuan County (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/071,071

(22) Filed: Feb. 15, 2008

(65) Prior Publication Data
US 2009/0207419 A1 Aug. 20, 2009

(51) Int. Cl.
*G01B 11/02* (2006.01)
(52) U.S. Cl. .................................. 356/498
(58) Field of Classification Search .......... 356/4.09, 356/498, 499, 511, 512, 521; 345/166; 250/221
See application file for complete search history.

(56) References Cited

U.S. PATENT DOCUMENTS 6,256,016 B1 * 7/2001 Piot et al. .................. 345/166

* cited by examiner

*Primary Examiner*—Tarifur Chowdhury
*Assistant Examiner*—Jonathan D Cook
(74) *Attorney, Agent, or Firm*—Rosenberg, Klein & Lee

(57) ABSTRACT

The present invention relates to a large area undistorted imaging apparatus for light speckles and a method thereof. The large area undistorted imaging apparatus for light speckles comprises a light-emitting device, a light-limiting module, and a sensor. The light-limiting module is adapted in front of the sensor, and includes a plurality of light-limiting members. The light-limiting members are arranged in a one- or two-dimensional array. When the light-emitting device emits light to an object surface, one or more rays of scattered light are produced. By means of the light-limiting module, said one or more rays of scattered light are limited, and a plurality of rays of diffraction light is produced. The plurality of rays of diffraction light within a certain angular field of view produced by a light-limiting member interferes with each other and produces a plurality of undistorted light speckles, and forms an array of light-speckle images on the sensor. Finally, according to the array of light-speckle images, a large-area and undistorted light-speckle pattern is given. Because the light-speckle pattern is undistorted and records the three-dimensional characteristics of the object surface, the undistorted imaging apparatus can be applied to computer mice, finger guiders, smart cards, three-dimensional fingerprint identification apparatuses, a machine tool or precise manipulator positioning systems.

24 Claims, 12 Drawing Sheets

LARGE AREAS UNDISTORTED IMAGING APPARATUS FOR LIGHT SPECKLES AND METHOD THEREOF

FIELD OF THE INVENTION

The present invention relates generally to an imaging apparatus for light speckles and a method thereof, and particularly to a large area undistorted imaging apparatus for light speckles and a method thereof.

BACKGROUND OF THE INVENTION

In 2004, a laser speckle pattern technology used in an optical mouse is published, which uses the principle of average size invariance in laser speckles to propose that the laser speckles will move as the light source moves with respect to the illuminated surface. Thereby, once the average moving velocity of the laser speckles on the detector is known, the relative movement information between the light source and the illuminated surface can be deduced. Thus, the technology can be applied to an optical mouse. Laser speckles are interference images of scattered light from an illuminated surface on a detector. The intensity of the images is related to the phase difference between the light paths of the scattered light. When the laser light source moves with respect to the illuminated surface, the phase differences of the scattered light paths changes accordingly, which result in corresponding changes in the interference images on the detector. Thereby, laser speckles are prone to distortion. Although changes in the light paths result in changes in the distribution of image intensity, the average intensity of images changes little, because it is only related to the intensity of the laser light source and to the reflectivity of the illuminated surface. When the laser light source moves with respect to the illuminated surface, said two conditions do not change, and thereby the average intensity of images barely changes. In addition, the roughness of the surface that causes the light speckles is evenly distributed, hence the average density of the laser speckles distributed on the detector should vary little, which means that the average size of the laser speckles varies little as well. The publication was filed in March 2003, and was accepted in June 2003. Thereafter, on Jan. 19, 2004 in Shenzhen of China, Chang applied the first patent named "An Optical Signal Processing Method of a Computer Mouse" using laser speckles to implement functions of a computer mouse. The patent, as the publication described above, declares that though the laser speckles distort, the average size of the laser speckles obeys the diffraction principle. Once the imaging apparatus for light speckles is fixed, the average size of the light speckles can be predicted. Chang proposed detecting the light speckles by using four detectors arranged in two perpendicular directions on a plane, with two detectors in each direction. When the laser light moves with respect to the illuminated surface the laser speckles move accordingly. By comparing the signal timing on the two horizontal and two vertical detectors caused by the light-speckle movement, the horizontal and vertical movement directions of the light speckles can be judged. Besides, in a sampling time, by multiplying the number of light speckles passing the detectors by the average size of light speckles gives the average movement distance in the sampling time. By knowing the movement directions and distance, the relative movement information between the light source and the illuminated surface can be calculated. The description above is the signal processing method provide by Chang.

The same idea is applied to the patent of a light-speckle stylus by Agilent Technologies. In April 2004, Agilent Technologies proposed the idea of adopting five detectors including top, bottom, left, right, and center sensors. The distances between the sensors are, in principle, approximately equal to the average size of light speckles. The movement information of the light speckles is given by the related timing of the light speckles passing said five sensors.

In February 2005, Agilent Technologies announced their patent of a laser mouse, which stressed that the laser speckle sizes of a normal optical pickup head are around hundreds of nanometers to several micrometers, which are too small in comparison to a sensor with 30 micrometers in pixel size. Accordingly, a sensor pixel can contain tens of light speckles, and hence the variation in signals of the light speckles is not obvious because averaging effect is easy to happen. Thereby, it is difficult to acquire effective information from the signals of the light speckles directly. Agilent Technologies emphasized that not only laser speckles are used in their patent. They proposed an optical pickup head design with specular reflection. In which light-path design taking advantage of the reflection angle being equal to the incident angle, two-dimensional sensors are set at the location where the reflection angle is equal to the incident angle. The signals of the reflection light and the scattered light are measured and analyzed to give the relative movement information between the light source and the illuminated surface.

The authors of the present invention also have filed a patent related to a laser computer mouse. The patent relates to an imaging apparatus for undistorted light speckles and a method thereof, which solve the distortion problem of laser speckles and the identification problem caused by small speckle sizes. The authors of the present invention proposed a two-dimensional imaging apparatus for light speckles by using non-specular reflection, which measure the laser speckles at the location where the scattering angle differs from the reflection angle by 10 degrees. In addition, a light-limiting device is adopted to limit the incident angular field of view at which the scattered light enters the two-dimensional detector, that is to say, to confine the imaging area on the surface. By properly combining such parameters as size of speckles, focal length of the imaging lens, angle of imaging, and imaging area of surface, an undistorted optical speckle pattern is created on the image surface. When the imaging apparatus has a relative motion with respect to the surface, an optical speckle emerges from one side of the image sensor and moves successively until it disappears on the other side of the sensor, the shape and intensity of this optical speckle remains the same. Since the speckle captured by the imaging apparatus is only shifted but distorted, it is favorite for precision pattern recognition.

The laser mouse developed by using the principle of average size invariance in light speckles as the basis for signal processing has the problem of cursor irregular jumping for some illuminated surfaces (such as glossy surfaces). This is because the glossier the illuminated surface is, the weaker the images of the light speckles are, and the smaller the sizes thereof. Thereby, the method with average size invariance can result in errors that cause instability in the results of signal processing. When this technology is applied to applications requiring precise angular resolution, for example, finger guidance, the demand cannot be satisfied.

The acquired images of light speckles by using specular reflection structure consist of two components. The majority component comes from the planar uniform reflection light; the minority component comes from the scattered light of rugged grains. The uniform reflection light has constant phase, while the scattered light of rugged grains changes in phases. These two kinds of light with distinct characteristics will interfere with each other and form interference patterns. By analyzing the correlation between two consecutive interference patterns, the relative movement information between the light source and the illuminated surface can be given. If the illuminated surface is very rough, then the amount of the uniform reflection will reduce drastically, the energy of the scattered light will increase, and the phases change rapidly, which is disadvantageous for the recognition of pattern correlation.

The imaging apparatus for light speckles and the method thereof developed previously by the authors of the present invention adopt a two-dimensional imaging apparatus which is properly combined with parameters such as size of speckles, focal length of the imaging lens, angle of imaging, and imaging area of surface. Thereby, when the light source moves with respect to the illuminated surface, the phase changes of the light speckles are limited effectively. As a result, the light-speckle patterns are resistant to distortion, which is advantageous to pattern recognition. However, because the light-limiting device is used to limit the angular field of view of the scattered light incident on the two-dimensional detector, the observation range on the surface of an object is limited to a small region. Besides, the relative moving distance between the imaging apparatus and the illuminated surface is constrained, otherwise the characteristic of undistortion in light speckles cannot be maintained 'when the observed small region is moving, which is unfavorable for the application of the technology especially for large-area detection on the surface of the object. If the tolerable relative moving distance with light-speckle undistorted is to be widened, the distance between the imaging lens and the surface of the object has to be lengthened to compensate the negative effect of increased moving distance. Thereby, the optical read head becomes larger, which does not comply with the trend of lightness, thinness, shortness, and smallness. Hence, improvements have to be made.

SUMMARY

An objective of the present invention is to provide a large area undistorted imaging apparatus for light speckles and a method thereof, which adopt a light-limiting module to acquire an array of plural undistorted light-speckle images.

Another objective of the present invention is to provide a large area undistorted imaging apparatus for light speckles and a method thereof, which reconstruct the array of plural undistorted light-speckle images and form a large area undistorted light-speckle pattern.

Still another objective of the present invention is to provide a large area undistorted imaging apparatus for light speckles and a method thereof. The light-speckle pattern according to the present invention is produced according to the three-dimensional variations of an object. In addition, because the light-speckle pattern is undistorted, the light-speckle pattern according to the present invention can be used to recognize object surfaces with three-dimensional variations.

In order to achieve the objectives described above, the present invention provides a large area undistorted imaging apparatus and a method thereof. The undistorted imaging apparatus comprises a light-emitting device, a light-limiting module, and a sensor. The light-limiting module adapted in the front of the sensor includes a plurality of light-limiting members. The light-limiting members are arranged in a one- or two-dimensional array. When the light-emitting device emits light to an object surface, scattered light is produced. The scattered light is limited through the light-limiting module, and then a plurality of rays of diffraction light is produced. The plurality of rays of scattered light interferes with each other, produces an array of plural undistorted light speckles, and forms images on the sensor. Finally, a large area undistorted light-speckle pattern is given according to the array of plural light speckles.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1A:
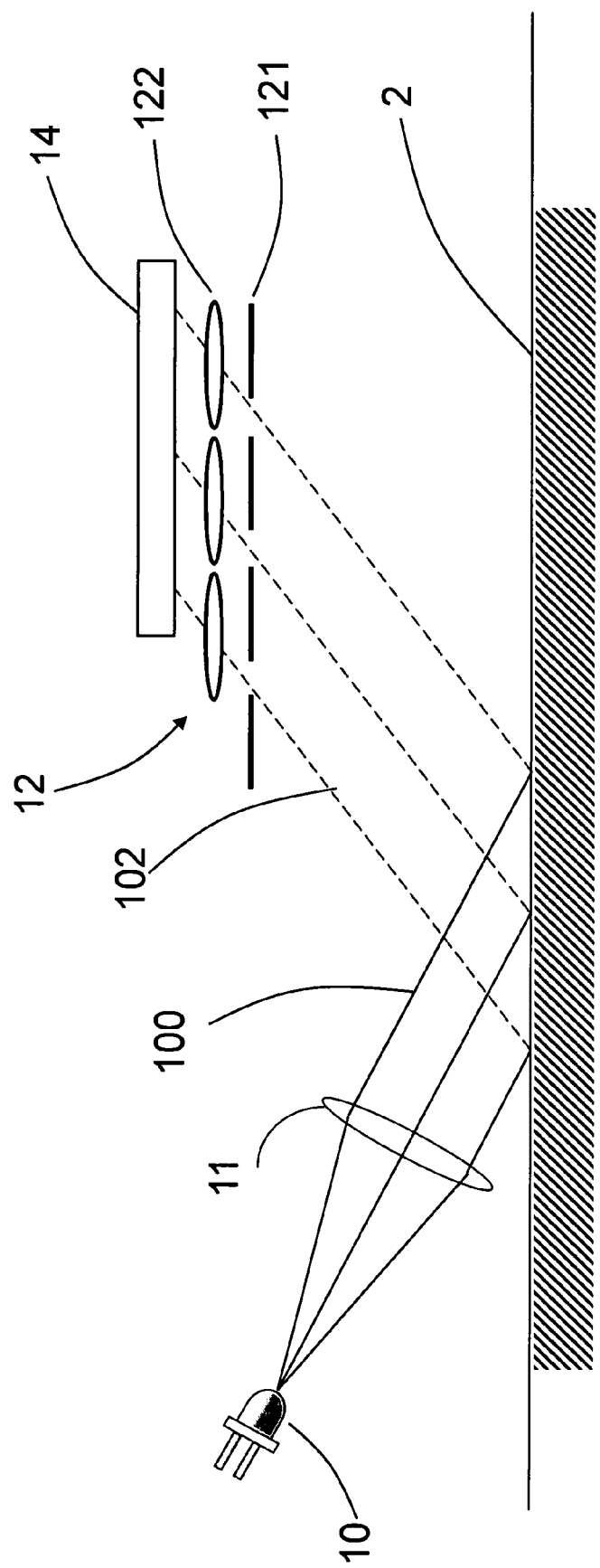
FIG. 1A shows a structural schematic diagram according to a preferred embodiment of the present invention.

FIG. 1A shows a structural schematic diagram according to a preferred embodiment of the present invention. As shown in the figure, the large area undistorted imaging apparatus for light speckles according to the present invention comprises a light-emitting device 10, a light-limiting module 12, and a sensor 14. The light-emitting device 10 emits collimated light 100 through a convergence lens 11 with high coherence to an object surface 2. The light-emitting device 10 can be a vertical cavity surface emitting laser (VCSEL), an edge emission laser (EEL), a highly coherent gas laser, a highly coherent solid-state laser, or a highly coherent light-emitting diode capable of emitting narrow-band light. The area that the light 100 emits on the object surface 2 can be determined by properly combining the light-emitting device 10 and the convergence lens 11 according to a predetermined area. The light-limiting module 12 has a plurality of light-limiting members. The light-limiting members are arranged in a one- or two-dimensional array. Each of the light-limiting members according to the present invention includes an aperture 121 and an imaging lens 122. The aperture 121 is adapted between the imaging lens 122 and the object surface 2. The plurality of apertures 121 and the plurality of imaging lenses 122 are arranged in one- or two-dimensional arrays. The sensor 14 is adapted behind the light-limiting module 12, and is a one- or two-dimensional sensor such a CCD or a CMOS sensor.

When the light-emitting device 10 emits the light 100 to the object surface 2, one or more rays of scattered light 102 are produced. The characteristics of said one or more rays of scattered light 102 depend on the roughness of the object surface 2. For example, if the object surface 2 is a glossy (mirror) surface, the rays of scattered light 102 produced by projecting the light 100 onto the object surface 2 will gather up to a reflection direction and have the identical energy as the light 100. On the contrary, if the object surface 2 is rugged (misty), after the light 100 is projected onto the object surface 2, rays of scattered light 102 with different directions will be produced.

From the description above, it is known that if the object surface 2 is rugged with three-dimensional variations, when the light 100 is projected thereon, one or more rays of scattered light 102 will be produced and propagate to random directions, and thereby light speckles that are easy to recognize are produced. On the contrary, the less the roughness of the object surface 2, the less obvious the scattering effect will be when the light 100 is projected on the object surface 2, and the more difficult the light speckles are to be recognized.

When the light 100 is projected on the object surface 2, one or more rays of scattered light 102 are produced. Then the light-limiting module 12 is used to receive said one or more rays of scattered light 102. The light-limiting module 12 has the plurality of light-limiting members. Said light-limiting members are arranged in a one- or two-dimensional array. Each of the light-limiting members includes an aperture 121 and an imaging lens 122. The imaging lens 122 is adapted behind the aperture 121. That is to say, the imaging lens 122 is adapted between the aperture 121 and the sensor 14. The plurality of light-limiting members limits the incident angular field of view at which said one or more scattered light 102 enter the sensor 14. The incident angular field of view is determined by the distance between the aperture 121 and the imaging lens 122 as well as by the diameters of the aperture 121 and the imaging lens 122. In addition, owing to the array of the plural apertures 121, a plurality of rays of diffraction light is produced by said one or more rays of scattered light 102. The plural rays of diffraction light pass the array of the plural imaging lenses 122 and produce an array of plural light-speckle images, of which the sizes can be controlled according to the diameter of the aperture 121. Once the incident angular field of view is properly determined by the positions and diameters of the aperture 121 and the imaging lens 122, each of the light-limiting members of the light-limiting module 12 will confine its own imaging area on the objective surface and correspondingly forms an independent image of a plurality of light speckles on the sensor 14. According to the array of the independent images of a plurality of light speckles and by means of image reconstruction, a large-area and undistorted light speckle pattern is produced.

Figure 1B:
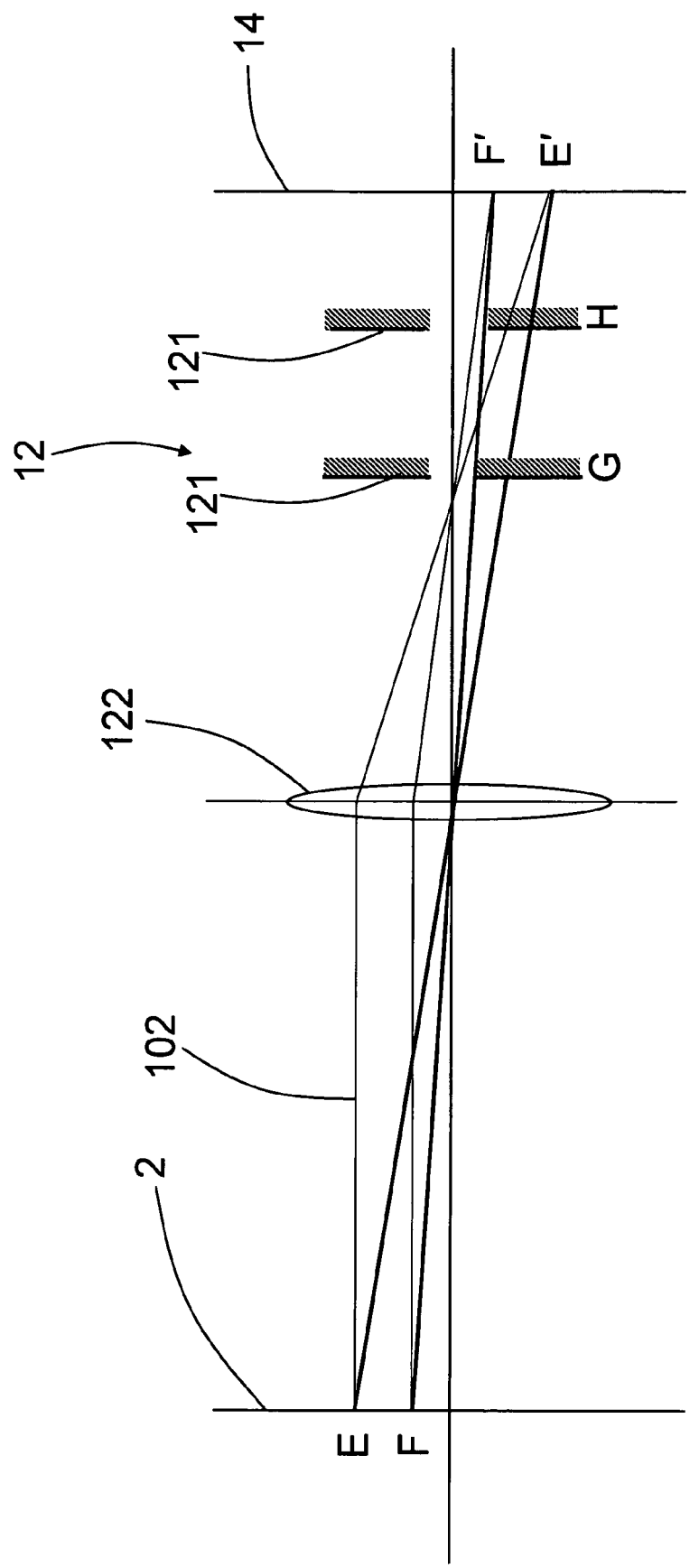
FIG. 1B shows a schematic diagram of the light path according to another preferred embodiment of the present invention.

FIG. 1B shows a schematic diagram of the light path including the relation between the aperture location and the angular field of view according to another preferred embodiment of the present invention. According to the preferred embodiment in FIG. 1A, the light-limiting members of the light-limiting module 12 include the plurality of imaging lenses and the plurality of apertures 121, both arranged in arrays. In FIG. 1B, only one lens 122 of the plurality of imaging lenses 122 and one aperture 121 of the plurality of apertures 121 are shown. The aperture 121 can be placed on the point G or the point H. The light-limiting member composed by the aperture 121 placed on the point H and the imaging lens 122 will block the scattered light relatively more away from the optical axis in compared to the light-limiting member composed by the aperture 121 placed on the point G and the imaging lens 122. From the present schematic diagram of the light path, the location of the plurality of aperture 121 placed between the plurality of imaging lenses 122 and the sensor 14 can control the incident angular field of view. In the present preferred embodiment, when the light is projected on the points E and F on the object surface 2, one or more rays of scattered light 102 are produced and the said one or more rays of scattered light pass through the imaging lens 122. When the aperture 121 is placed on the point G, said one or more rays of scattered light 102 produced when the light is projected on the points E and F can form images on the points E' and F' of the sensor 14 by passing the imaging lens 122, where the luminous flux of the point F' is greater than that of the point E'. If the aperture 121 is placed on the point H, only the point F, which is closer to the optical axis, can form an image on the point F' of the sensor 14 through the imaging lens 122. On the other hand, the point E, which is relatively more away from the optical axis, cannot form an image on the sensor 14 through the imaging lens 122. According to the present preferred embodiment, the aperture functions as an aperture stop; the imaging lens 122 functions as a field stop. In the present preferred embodiment, only one of light-limiting members is taken for example. The light-limiting module 12 according to the present embodiment includes the plurality of light-limiting members. The light-limiting members are arranged in a one- or two-dimensional array. By properly adjusting the opening and locations of the aperture 121, the size of the light speckles can be controlled, and the incident angular field of view at which said one or more rays of scattered light 102 enter the sensor 14 can be limited effectively.

Figure 1C:
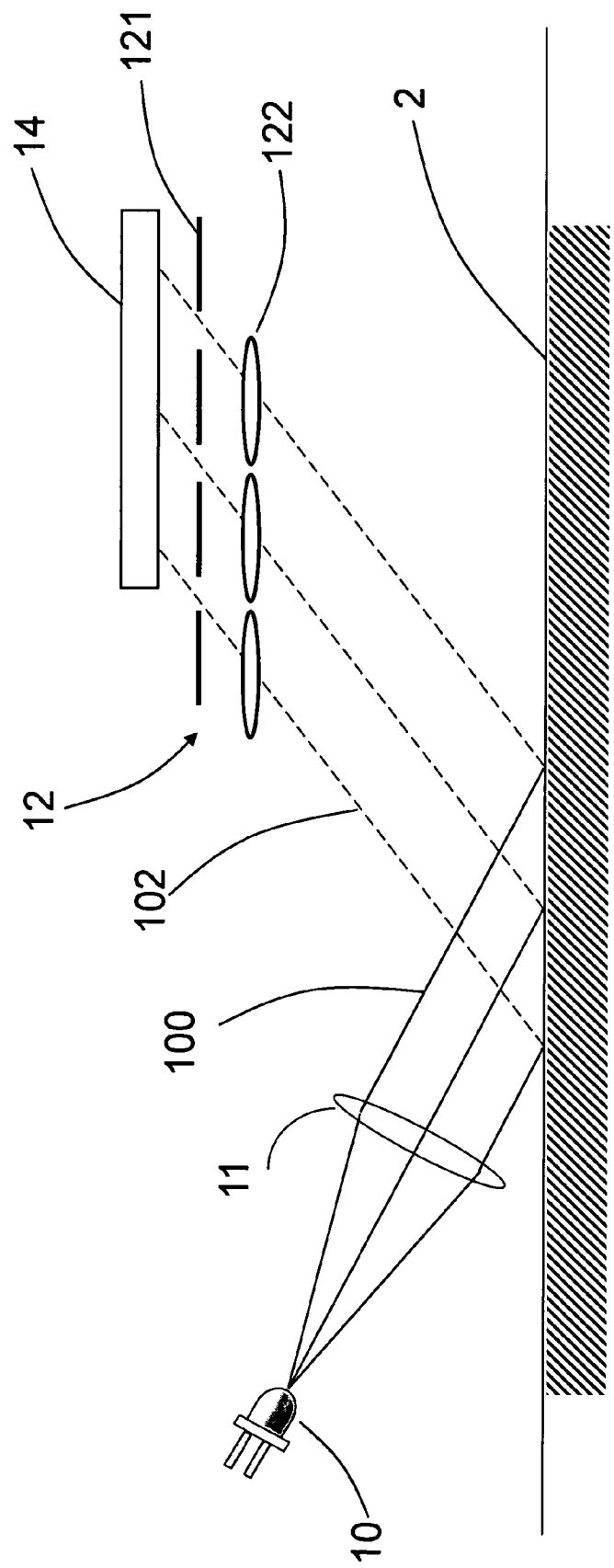
FIG. 1C shows a structural schematic diagram according to another preferred embodiment of the present invention.

FIG. 1C shows a structural schematic diagram according to another preferred embodiment of the present invention. The light-limiting module 12 according to the present preferred embodiment includes a plurality of light-limiting members arranged in an array. Each of the light-limiting members includes an imaging lens 122 and an aperture 121. However, the difference between the present preferred embodiment and the one in FIG. 1A is that, as shown in the figure, the imaging lens 122 is adapted in front of the aperture 121. That is to say, the aperture 121 is adapted between the imaging lens 122 and the sensor 14.

Figure 2:
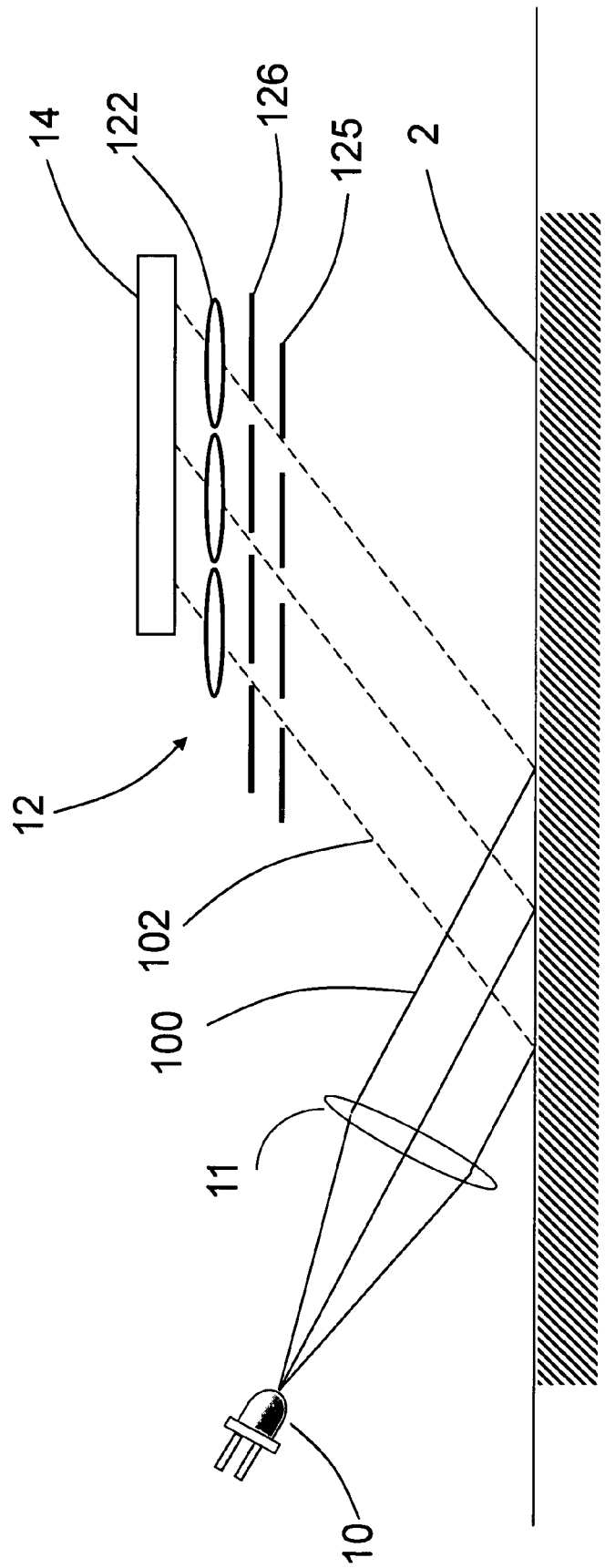
FIG. 2 shows a structural schematic diagram according to another preferred embodiment of the present invention.

FIG. 2 shows a structural schematic diagram according to another preferred embodiment of the present invention. As shown in the figure, the difference between the present preferred embodiment and the one in FIG. 1A is that the light-limiting module 12 according to the present preferred embodiment includes a plurality of light-limiting members arranged in an array, and each of which light-limiting members includes an imaging lens 122, a first aperture 125 and a second aperture 126. The imaging lens 122 is adapted behind the first and the second apertures 125, 126. That is to say, the imaging lens 122 is adapted between the second aperture 126 and the sensor 14. The order from the light-limiting module 12 to sensor 14 is the first aperture 125, the second aperture 126, the imaging lens 122 and the sensor 14. When the light-emitting device 10 emits the light 100 to the object surface 2 and produce one or more rays of scattered light 102, the plurality of first apertures 125 blocks part of said one or more rays of scattered light and limits said one or more rays of scattered light 102 from entering the sensor 14. After part of said one or more rays of scattered light pass through the plurality of first apertures 125, the plurality of second apertures 126 is used to limit again part of said one or more rays of scattered light 102 from entering the sensor 14. The diameters of the pluralities of first and second apertures 125, 126 and the distance there between determine the incident angular field of view at which said one or more rays of scattered light 102 enter the sensor 14. Then, said one or more rays of scattered light 102 within the angular field of view will produce the plurality of rays of diffraction light, form the plurality of light speckles, and form an array of the plurality of light-speckle images on the sensor 14 by passing through the plurality of imaging lenses 122 arranged in an array. Afterwards, the array of the plurality of light-speckle images is reconstructed to form a large-area and undistorted light-speckle pattern. The order of the plurality of imaging lenses 122, the plurality of first aperture 125, and the plurality of second apertures 126 can be that the plurality of imaging lenses 122 is adapted in front of the pluralities of first and second apertures 125, 126. Namely, the pluralities of first and second apertures 125, 126 are adapted between the plurality of imaging lenses 122 and the sensor 14. Besides, the plurality of imaging lenses 122 can also be adapted between the plurality of first apertures 125 and the plurality of second apertures 126.

Figure 3A:
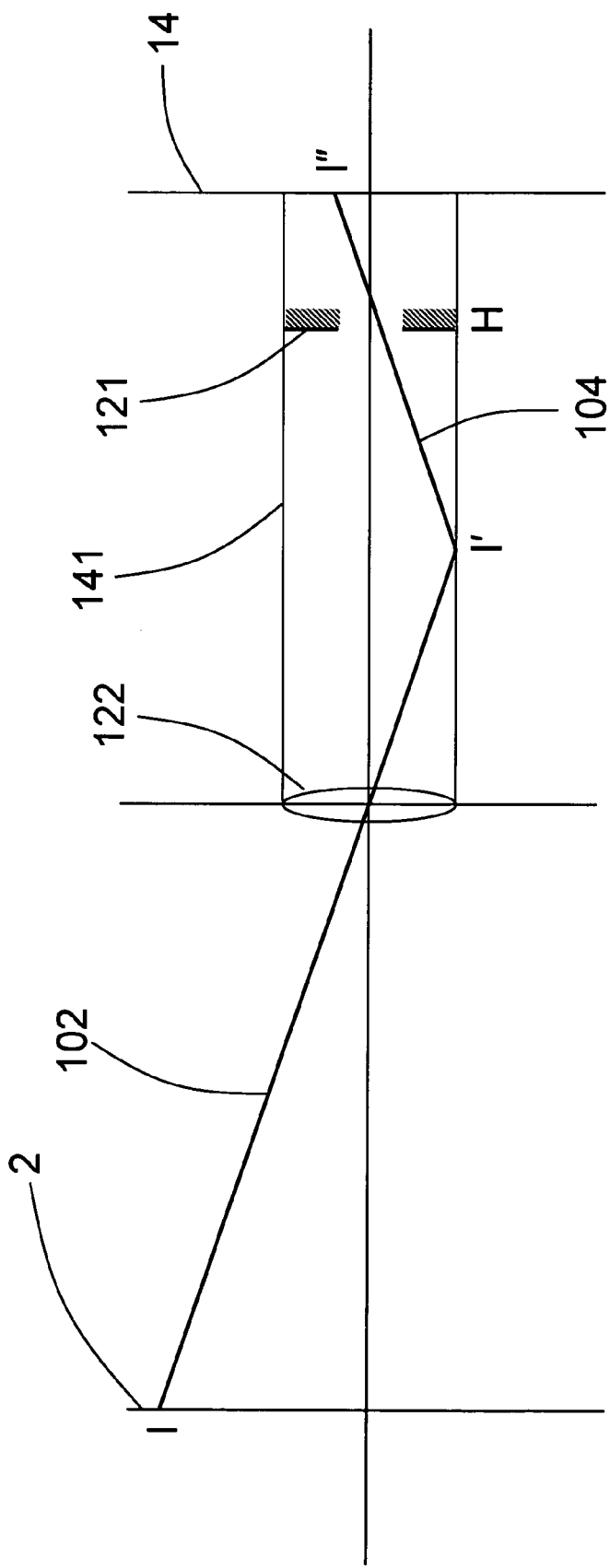
FIG. 3A shows a schematic diagram of secondary scattered light according to the present invention.

FIG. 3A shows a schematic diagram of secondary scattered light according to the present invention. As shown in the figure, the difference between the present preferred embodiment and the one in FIG. 1B is that in the present preferred embodiment, the light-limiting member includes the imaging lens 122 and the aperture 121, and a sleeve 141 which is further adapted on the sensor 14 to obstruct the surrounding stray light. The said one or more rays of scattered light 102 produced by the point I, which are not within the incident angular field of view of the object surface 2, namely, not in the signal region, will project to the point I' on the inner wall of the sleeve 141. The point I' will produce a ray of secondary scattered light 104, which can pass through the aperture 121 adapted on the point H, and project to the point I" on the sensor 14. If the secondary scattered light 104 cannot be eliminated effectively, undistortion of speckle images will be destroyed. Because the phase of the secondary scattered light cannot be controlled in force, the speckle images, which are the results of superposition of the first scattered light 102' and the secondary scattered light 104, detrimentally glitter. It is disadvantageous to signal processing.

Figure 3B:
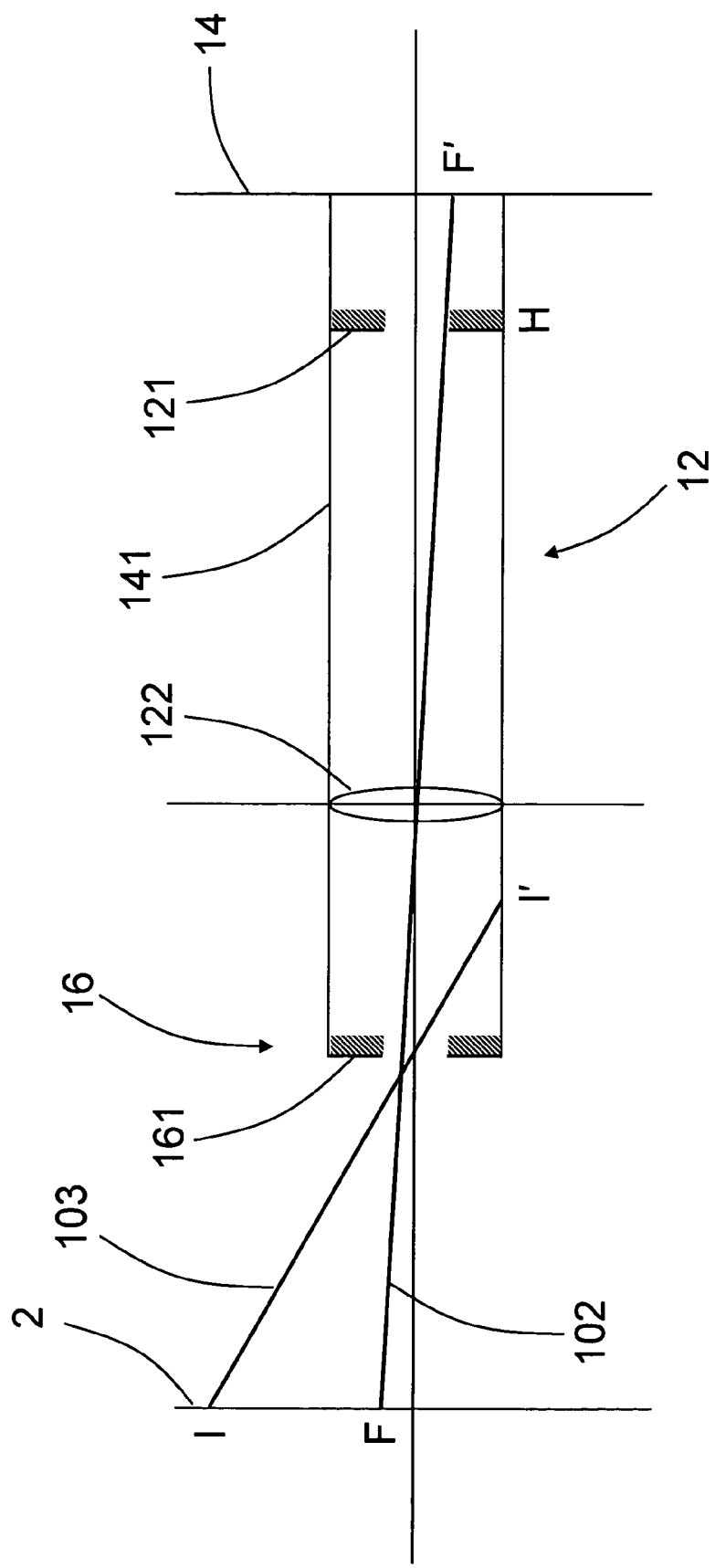
FIG. 3B shows a schematic diagram of the light path according to another preferred embodiment of the present invention.

FIG. 3B shows a schematic diagram of the light path according to another preferred embodiment of the present invention. As shown in the figure, the difference between the present preferred embodiment and the one in FIG. 3A is that in the present preferred embodiment, a pre-light-limiting module 16 is adapted in front of the light-limiting module 12, in order to block said secondary scattered light 104 from entering the sensor 14, which will cause the speckle images to glitter on the sensor 14. The pre-light-limiting module 16 has a plurality of pre-light-limiting members. The pre-light-limiting members are pre-apertures 161 arranged in a one- or two-dimensional array. In the present preferred embodiment, one of the light-limiting members and one of the pre-light-limiting members are taken as an example. Because the pre-light-limiting module 16 is adapted between the object surface 2 and the light-limiting module 12, the plurality of light-limiting members of the light-limiting module 12 includes the plurality of imaging lenses 122 and the plurality of apertures 121, thereby, the pre-aperture 161 is adapted between the object surface 2 and the imaging lens 122; the aperture 121 is adapted between the imaging lens 122 and the sensor 14. When the light is projected on the points F and I of the object surface 2, said one or more rays of scattered light 102 produced by the point F located in the signal region can pass the pre-aperture 161, the imaging lens 122, and the aperture 121 and go forward to the sensor 14 to form an image. On the other hand, said one or more rays of scattered light 102 produced by the point I located in the non-signal region are blocked by the pre-aperture 161. The rest of said one or more rays of scattered light 103, which pass through the pre-aperture 161, is projected to the sleeve 141, and the produced secondary scattered light cannot enter the sensor 14. Thereby, background noise light can be reduced effectively, the signal-to-noise ratio of the sensor 14 can be enhanced and the outcome of undistortion of speckle images is acquired. According to the present preferred embodiment, the pre-light-limiting module 16 adapted in front of the light-limiting module 12 can prevents effectively the secondary scattered light produced by projecting said one or more rays of scattered light 103 to another object surface from entering the sensor 14. Hence, the background noise of the sensor 14 can be reduced effectively and the undistorted speckle images are acquired further.

Figure 3C:
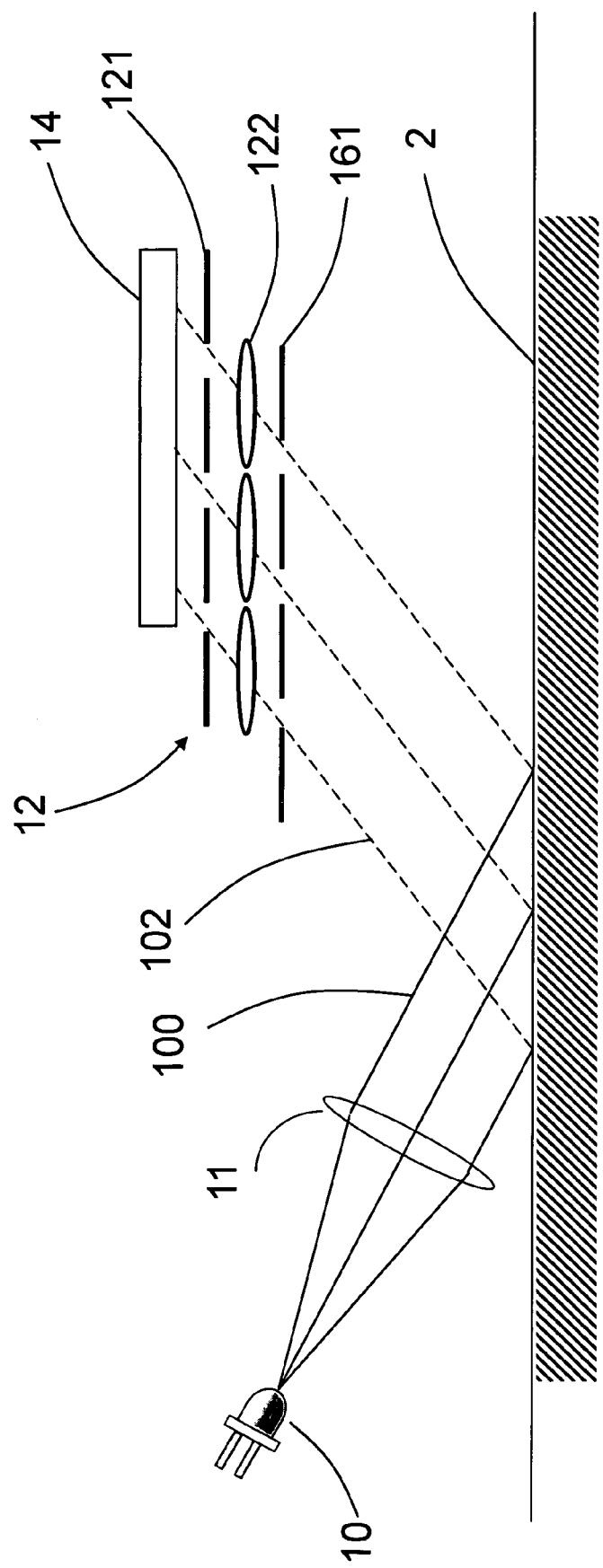
FIG. 3C shows a structural schematic diagram according to another preferred embodiment of the present invention.
Figure 3D:
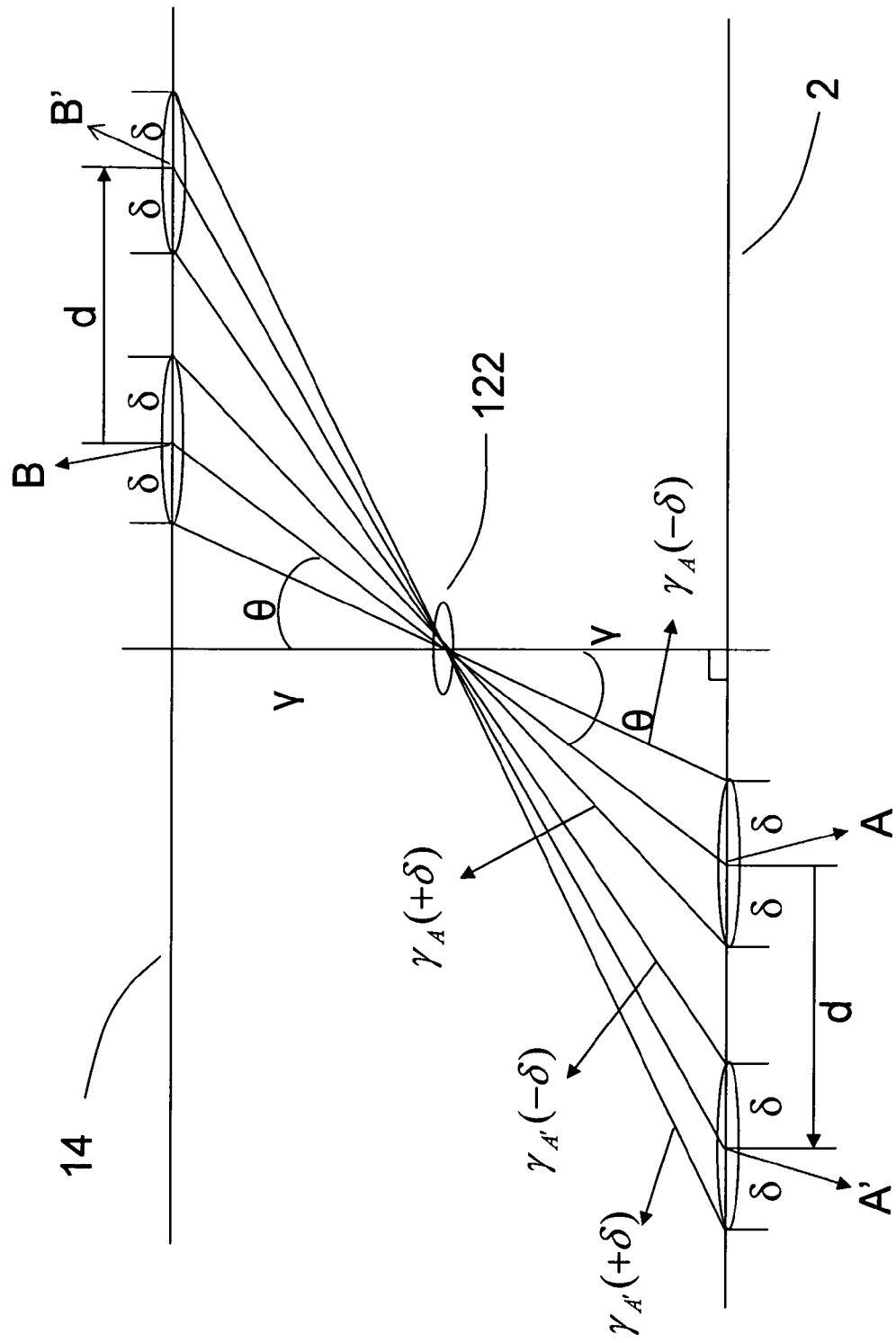
FIG. 3D shows a schematic diagram of the relative optical path length difference of the undistorted speckle movement.

FIG. 3C shows a structural schematic diagram according to another preferred embodiment of the present invention. As shown in the figure, the difference between the present preferred embodiment and the one in FIG. 1C is that in the present preferred embodiment, in addition to the light-limiting members including the plurality of imaging lenses 122 and the plurality of apertures 121, between the plurality of imaging lenses 122 arranged in an array and the object surface 2, the plurality of pre-apertures 161 arranged in an array is added. The pre-aperture 161 can prevent the secondary scattered light produced by said one or more rays of scattered light 102 projected onto another object surface from entering the sensor 14.

FIGS. 1A to 3C are preferred embodiments according to the undistorted imaging apparatus for light speckles of the present invention. The undistorted imaging apparatus comprises mainly a light-emitting device, a pre-light-limiting module, a light-limiting module, and a sensor. The light-limiting module includes a plurality of light-limiting members. The light-limiting members are arranged in a one or two-dimensional array. The imaging area on the object surface 2 of each of the light-limiting members overlaps partially with that of the adjacent light-limiting members. In addition, the maximum relative optical path length difference of each of the light-limiting members is far smaller than the wavelength of the light. Thereby, the light speckles formed on the sensor by each of the light-limiting members do not distort. Finally, by using image reconstruction, the array of plural light-speckle images produced by means of the light-limiting modules is reconstructed to a large-area and undistorted light-speckle pattern. Accordingly, the technology can be applied to computer mice, finger guiders, smart cards, three-dimensional fingerprint identification apparatuses, a machine tool or precise manipulator positioning systems.

The undistorted imaging apparatus according to the present invention uses the plurality of light-limiting members arranged in an array for imaging, and uses image reconstruction to acquire a large-area and undistorted light-speckle pattern. If the imaging apparatus includes only an imaging lens without an aperture to limit the angular field of view, then the object surface seen by the imaging lens is a large-range field of view. The light-speckle pattern formed by the large-region field of view on the sensor by means of lenses without an aperture will change interference conditions owing to the relative movement between the imaging lens and the object surface. Thereby, the distribution of light intensity after movement differs from the one before movement in the light-speckle pattern. The undistorted imaging apparatus according to the present invention includes a light-limiting member to limit the angular field of view, and thereby the field of view seen by the light-limiting member becomes a small range. When the imaging lens moves with respect to the object surface, the interference condition of imaging by the small range on the sensor will not change drastically. Hence, the distribution of light intensity of the light-speckle pattern is barely changed. The light-speckle pattern moves but does not distort. However, the relative moving distance is also limited for maintaining undistortion. For example, in the imaging system, FIG. 3D, the distance between the object plane and the image plane equals to four times of the focal length and the magnification equals to one. Because of the function of the light-limiting member, when the object surface moves by the distance d with respect to the imaging apparatus, the maximum relative optical path length difference of the imaged light speckles before and after movement is:

$$\Delta(nL) = 2 \cdot [\gamma_{A'}(+\delta) - \gamma_{A'}(-\delta)] - 2 \cdot [\gamma_A(+\delta) - \gamma_A(-\delta)] \text{ or} \quad (1)$$

$$\Delta(nL) \approx \frac{4\delta d}{\gamma} \cos^3\theta$$

where $2\delta$ is the average diameter of the light speckles; d is the relative movement distance between the undistorted imaging apparatus for light speckles and the object surface; $2\gamma$ is the distance between the sensor and the object surface; and $\theta$ is the angle between the optical axis of the imaging apparatus and the normal of the object surface. In order to achieve the purpose of undistortion in light speckles, the variation of the maximum relative optical path length difference has to be much smaller than a wavelength, $\Delta(nL) << \lambda$. According to our experience in the present invention, the minimum requirement of variation of the maximum relative optical path length difference for undistorted light speckles is that $4\delta d \cos^3 \theta/\gamma < \lambda/5$. For a finished imaging apparatus, $\delta$, $\gamma$, and $\theta$ are fixed. To satisfy the undistortion condition for light speckles, that is, $\Delta(nL) < \lambda/5$, the allowable movement distance d will be constrained. If the imaging apparatus for light speckles is applied to small electronic devices, such a PDAs or notebook computers, the distance between the sensor and the object surface ($2\gamma$) has to be shrunk. If the condition $\Delta(nL) < \lambda/5$ is to be satisfied, a larger movement distance (d) can not be allowed, that limits the practicability of the imaging apparatus for light speckles with a light-limiting member only. Owing to light-limiting module with members arranged in an array according to the undistorted imaging apparatus for light speckles and the method thereof provided by the present invention, the maximum relative variation of optical path length difference $\Delta(nL)$ can be smaller than fifth wavelength in a small-sized ($\gamma$) structure and a large-area undistorted light-speckle pattern is given without the limitation on movement distance (d), while performing large-area detection on the object surface. Suppose the allowable maximum movement distance is $d_{max}$ in which the undistortion condition for light speckles, $\Delta(nL) < \lambda/5$, is satisfied for each of the light-limiting members in the array of the light-limiting module. That is to say, $$d_{max} \approx \frac{\lambda}{5} \cdot \frac{\gamma}{4\delta\cos^3\theta}.$$

Let the distance between two adjacent light-limiting members (l) be smaller than $d_{max}$. In addition, under the limit of incident angular field of view, the imaging regions on the object surface overlap partially with that of the adjacent light-limiting members. Because of the limit of incident angular field of view and the undistortion limitation $l < d_{max}$, the overlap part of light-speckle patterns seen by two adjacent light-limiting members are identical. Then, the adjacent light-speckle patterns in the array can be successively organized to form a continuous light-speckle pattern. Consider a light-limiting member. When it moves left by a distance l, the imaging region seen is the imaging region exactly seen by its left adjacent light-limiting member just before movement. There exists consequentially a part of imaging region repeatedly seen by said light-limiting member before and after movement is the overlap part described above. The light-speckle pattern in the overlap part is undistorted. The imaged light-speckle patterns formed by two adjacent light-limiting members provide the characteristic of movement undistortion. Thereby, when the imaging apparatus moves by a distance l, the large-area continuous light-speckle pattern arranged from the array images also moves but the light-speckle pattern thereof is unchanged. When the imaging apparatus moves by a more distance l, the light-speckle pattern is still maintained. Of course, during movement, there are light speckles disappearing unceasingly at one edge of the continuous light-speckle pattern and there are new light speckles of new imaging regions produced at the other edge. Developing the characteristics of the imaging apparatus for light speckles according to the present invention, the present technology can be applied to small electronic devices while having large-area and undistorted light-speckle patterns after long-distance movement. After image-reconstructing the array of plural light-speckle images produced by the light-limiting modules of the undistorted imaging apparatus for light speckles according to the present invention, the large-area light-speckle pattern is given. Because each of the light-speckle images is undistorted, the final large-area light-speckle pattern is undistorted accordingly.

Figure 4:
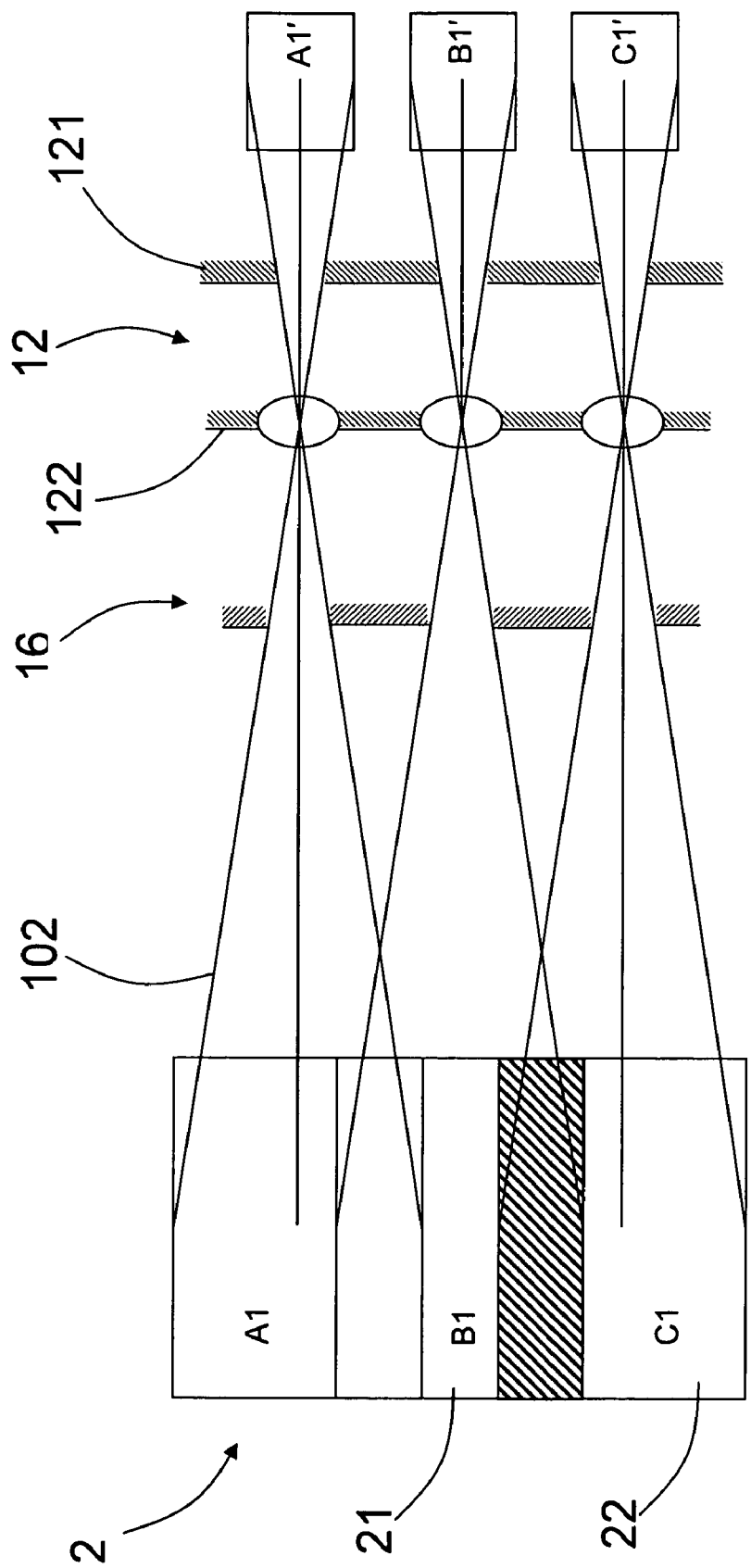
FIG. 4 shows a schematic diagram of an array of plural light speckles according to the present invention.

FIG. 4 shows a schematic diagram of a plurality of light speckles according to the present invention. As shown in the figure, the present invention provides an undistorted imaging apparatus for light speckles, which comprises a light-limiting module 12. The light-limiting module 12 includes a plurality of light-limiting members. The light-limiting members are arranged in a one- or two-dimensional array. In the present preferred embodiment, the plurality of light-limiting members is arranged in one-dimensional for example. Each of the light-limiting members includes an imaging lens 122 and an aperture 121. The magnification of the imaging lens 122 is set to M. In the present preferred embodiment, M is 0.5. The object surface 21 sampled by a light-limiting member overlaps partially with the object surface 22 sampled by the adjacent light-limiting member. When one or more rays of scattered light 102 produced by projecting the light onto the object surface 2 pass through the light-limiting module 12, the images on the sensor formed by each of light-limiting members separate with each other. For example, the A1 object surface will form image on the A1' surface. Likewise, the B1 object surface will form image on the B1' surface; and the C1 object surface will form image on the C1' surface. Although the A1 surface overlaps partially with the B1 surface, and the B1 surface overlaps partially with the C1 surface, according to the image magnification, A1', B1', and C1' surfaces are separated by the functions of the light-limiting members. Thereby, by using the apparatus according to the present invention, the object surface 2 can be divided effectively to give a plurality of imaging regions. Besides, a pre-light-limiting module 16 is adapted in front of the light-limiting module 12 for preventing the secondary scattered light, which is produced by said one or more rays of scattered light 102 projecting onto another object surface, from entering the sensor. Thus, the signal-to-noise ratio of the sensor can be enhanced. The method described above can be extended to be applied to a light-limiting module arranged in a two-dimensional array.

Figure 5:
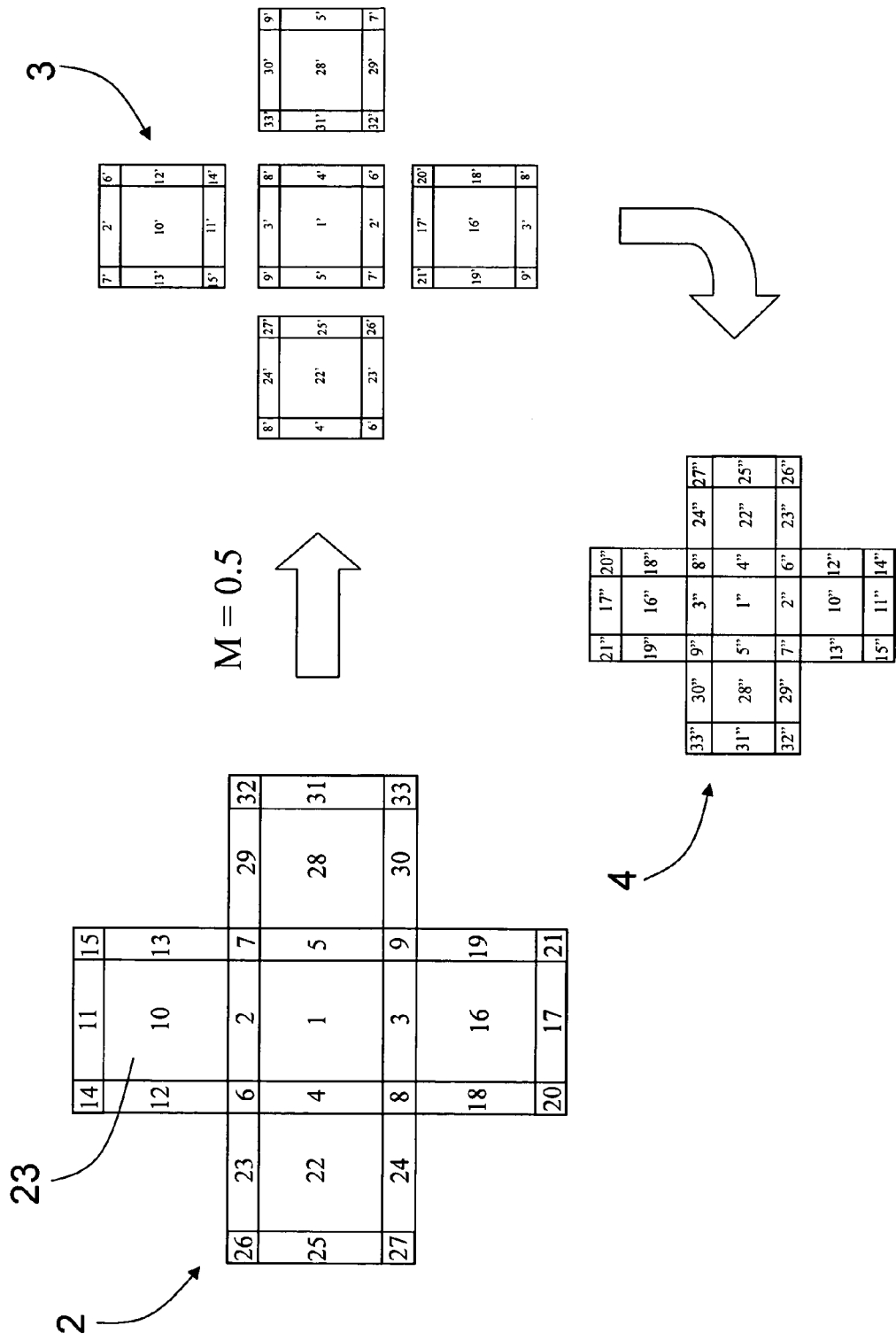
FIG. 5 shows a schematic diagram of image reconstruction according to another preferred embodiment of the present invention.

FIG. 5 shows a schematic diagram of image reconstruction according to another preferred embodiment of the present invention. As shown in the figure, the magnification of the imaging lens 122 is set to 0.5 and the object surface is divided into a plurality of blocks by the light-limiting array module 12. Each of the blocks 23 overlaps partially with the adjacent blocks. Then, by means of the undistorted imaging apparatus for light speckles according to the present invention, a plurality of light-speckle blocks 3 is given as a two-dimensional array. The images of the plurality of light-speckle blocks 3 formed on the sensor 14 are separated. Two adjacent blocks 23 are imaged twice repeatedly on the overlap part, such as the blocks 2, 3, 4, 5. Some of the blocks 23 are imaged three times repeatedly, such as the blocks 6, 7, 8, 9. The objective of repeated imaging is to record all information on the object surface 2 but not to miss any information thereof when the undistorted imaging apparatus for light speckles moves with respect to the object surface 2. Because the geometric structures of each of the light-limiting members in the light-limiting module are identical, and the light-speckle blocks 3 formed correspondently from each of the array of blocks 23 almost do not distort after movement, the light-speckle pattern 4 image-reconstructed by the array of the plurality of light-speckle blocks 3, which is given by the undistorted imaging apparatus for light speckles, does not distorts once being image-reconstructed, even if the large-area object surface 2 including a plurality of blocks 23 moves with respect to the imaging apparatus.

Figure 6A:
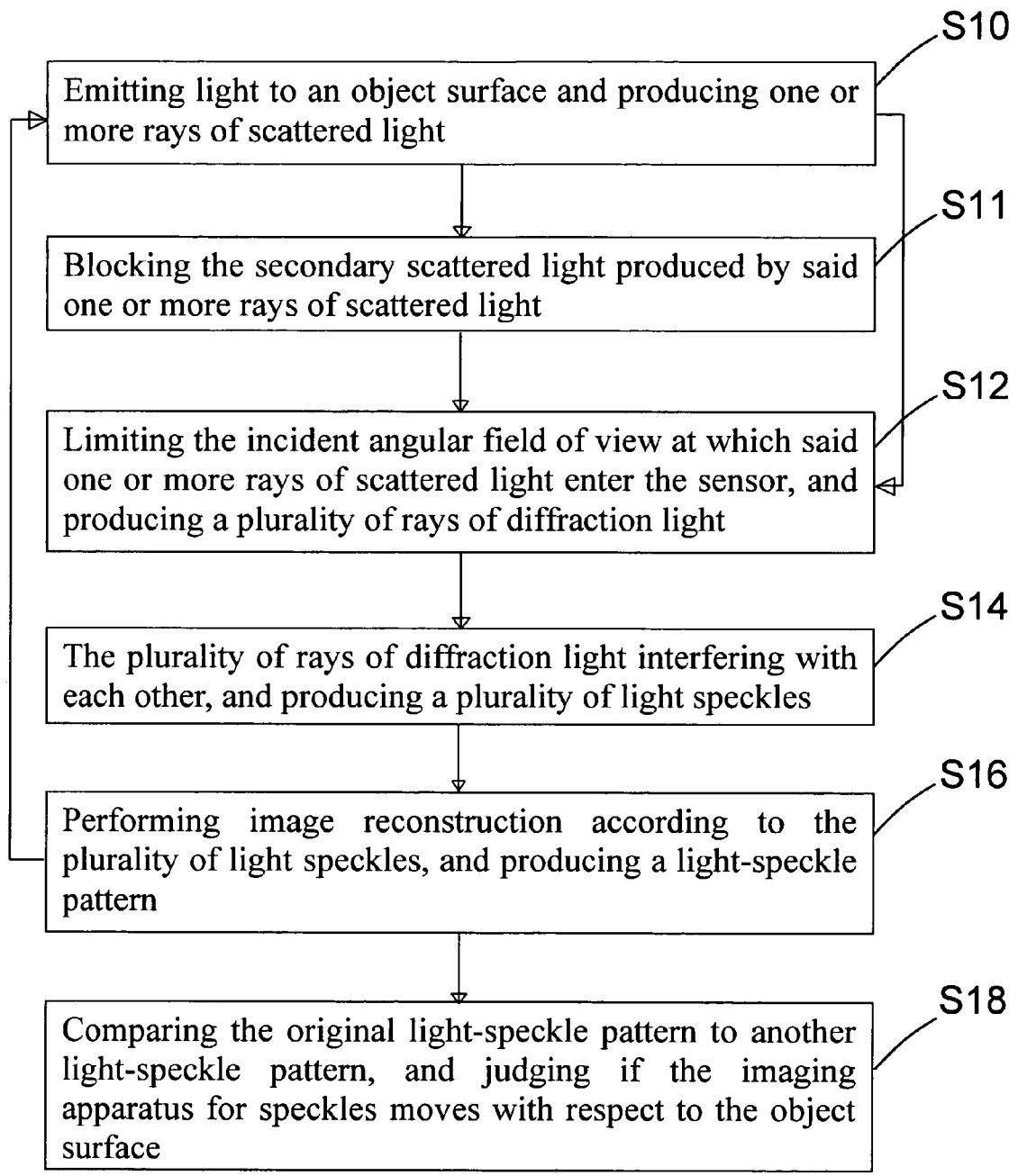
FIG. 6A shows a flowchart according to another preferred embodiment of the present invention.

FIGS. 1C and 6A show a structural schematic diagram and a flowchart, respectively, according to another preferred embodiment of the present invention. As shown in the figures, the present preferred embodiment provides an undistorted imaging apparatus for light speckles and a method thereof, which can be applied to a laser mouse or the other navigators. The undistorted imaging apparatus for light speckles comprises a light-emitting device 10, a light-limiting module 12, and a sensor 14. The method for applying to a laser mouse or the other navigators includes: First, the step S10 is executed, in which step the light-emitting device 10 emits light 100 to an object surface 2 facing the laser mouse or the other navigators and produces one or more rays of scattered light 102. Then, the step S12 is executed, in which step said one or more rays of scattered light 102 enter the light-limiting module 12, which includes a plurality of light-limiting members arranged in a one- or two-dimensional array for limiting the incident angular field of view at which said one or more rays of scattered light 102 enter the sensor 14. Each of the light-limiting members produces a plurality of rays of diffraction light. Next, the step S14 is executed, in which step the plurality of rays of diffraction light within a certain angular field of view produced by a light-limiting member interferes with each other and produces a plurality of light speckles. Afterwards, the step S16 is executed, in which step image reconstruction is performed according to the image array of the plurality of light speckles and a light-speckle pattern is produced. Finally, the step S18 is executed, in which step the light-speckle pattern is used as a basis to repeat the steps S10 to S16 for giving another light-speckle pattern. Then, compare the original light-speckle pattern to another one to judge if the undistorted imaging apparatus for light speckles moves with respect to the object surface 2. Furthermore, the movement direction and distance of the undistorted imaging apparatus for light speckles are judged and used as the movement of a cursor on the computer screen. Besides, the structure of the undistorted imaging apparatus for light speckles adapted in the computer mouse or the other navigators can be the one shown in FIG. 3C. A pre-light-limiting module 16 is adapted between the object surface 2 and the light-limiting module 12. Thereby, after the step S10 is executed, the step S11 is executed, in which step the pre-light-limiting module 16 is used to avoid the adverse effect of the secondary scattered light produced by said one or more rays of scattered light 102, which are produced by projecting the light onto the object surface 2, onto another object surface. Thus, the background noise of the sensor 14 is reduced, and recognition of the plurality of light speckles can be enhanced.

Figure 6B:
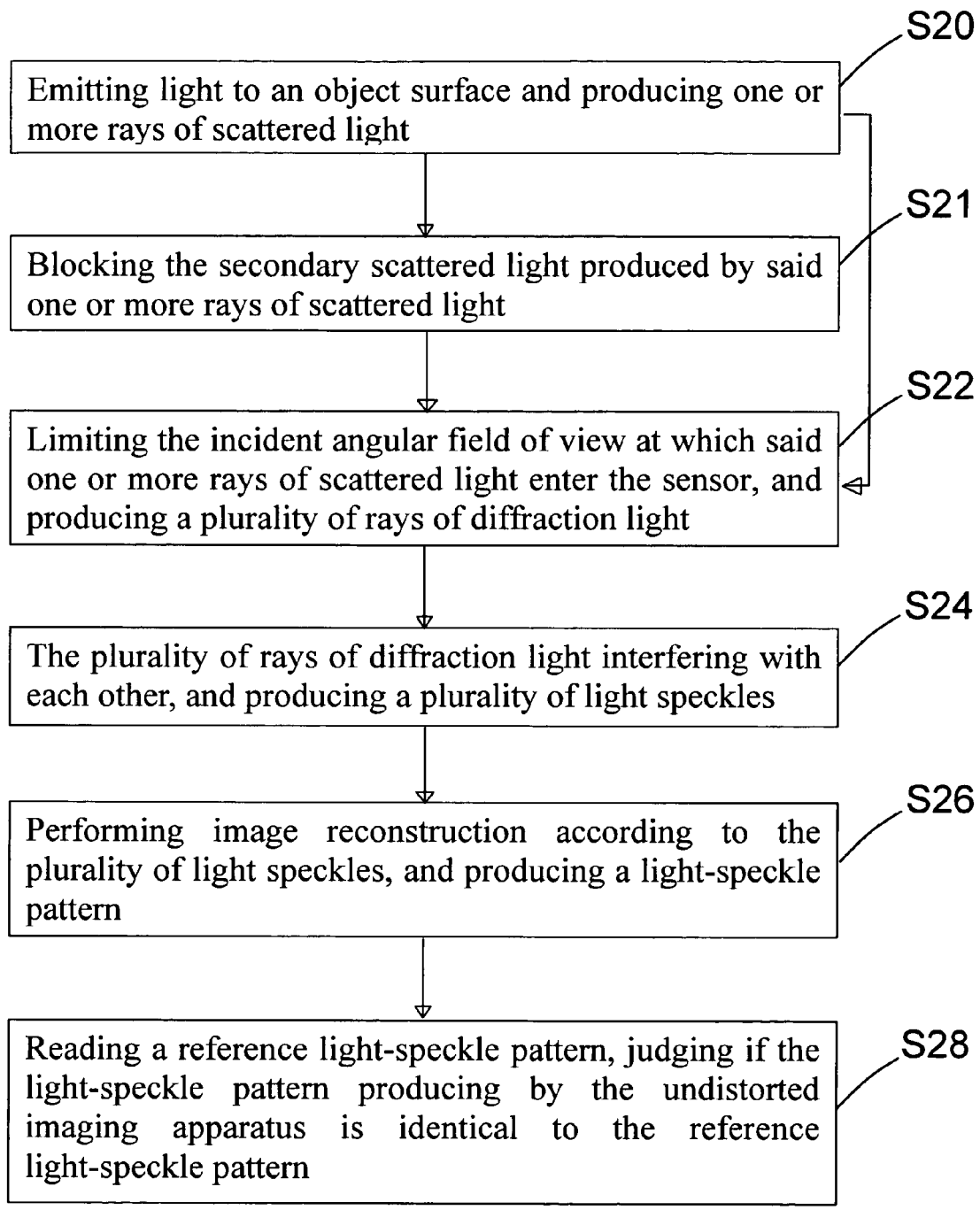
FIG. 6B shows a flowchart according to another preferred embodiment of the present invention.

FIGS. 1C and 6B show a structural schematic diagram and a flowchart, respectively, according to another preferred embodiment of the present invention. As shown in the figures, the present preferred embodiment provides an undistorted imaging apparatus for light speckles and a method thereof. Because the light-speckle pattern is produced according to the object surface 2 with three-dimensional variations, it can be applied for recognizing the object surface 2 with three-dimensional variations, and thereby can be further applied to fingerprint recognition apparatuses or precise positioning. The method for applying to recognition of the object surface 2 with three-dimensional variations includes: First, the step S20 is executed, in which step the light-emitting device 10 emits light 100 to an object surface 2 with three-dimensional variations and produces one or more rays of scattered light 102. Then, the step S22 is executed, in which step said one or more rays of scattered light 102 enter the light-limiting module 12, which includes a plurality of light-limiting members arranged in a one- or two-dimensional array for limiting the incident angular field of view at which said one or more rays of scattered light 102 enter the sensor 14. Each of the light-limiting members produces a plurality of rays of diffraction light. Next, the step S24 is executed, in which step the plurality of rays of diffraction light within a certain angular field of view produced by a light-limiting member interferes with each other and produces a plurality of light speckles. Afterwards, the step S26 is executed, in which step image reconstruction is performed according to the image array of the plurality of light speckles and a light-speckle pattern is produced. In addition, the sensor 14 can be connected to a storage unit, which stores one or more reference light-speckle patterns. Finally, the step S28 is executed, in which step one of the reference light-speckle patterns in the storage unit is read. According to the reference light-speckle pattern, the light-speckle pattern produced by the undistorted imaging apparatus for light speckles is judged to be identical to the reference light-speckle pattern or not. Likewise, when the undistorted imaging apparatus for light speckles is applied to a fingerprint recognition apparatus, the reference light-speckle pattern of each person is established in the storage unit. Then, by means of the undistorted imaging apparatus for light speckles, the light-speckle pattern of everyone's fingerprint is taken and is compared to the reference light-speckle patterns stored in the storage unit for performing fingerprint recognition function. Besides, the structure of the undistorted imaging apparatus for light speckles applied in recognizing the object surface with three-dimensional variations can be the one shown in FIG. 3C. A pre-light-limiting module 16 is adapted between the object surface 2 and the light-limiting module 12. Thereby, after the step S10 is executed, the step S21 is executed, in which step the pre-light-limiting module 16 is used to avoid the adverse effect of the secondary scattered light produced by projecting said one or more rays of scattered light 102, which are produced by projecting the light onto the object surface 2, onto another object surface. Thus, the background noise of the sensor 14 is reduced, and recognition of the plurality of light speckles can be enhanced.

The difference between the preferred embodiments in FIG. 6A and FIG. 6B is that when the undistorted imaging apparatus for light speckles in the preferred embodiment of FIG. 6A is applied to applications such as a laser mouse or a precise positioning device, the undistorted imaging apparatus for light speckles is movable, while the object surface facing the undistorted imaging apparatus for light speckles is fixed. On the contrary, when the undistorted imaging apparatus for light speckles according to the preferred embodiment of FIG. 6B is applied to recognizing object surfaces with three-dimensional variations, such as a finger guider, a smart card, or a three-dimensional identification device, the three-dimensional object surface is movable, while the undistorted imaging apparatus for light speckles is fixed.

To sum up, the present invention provides an undistorted imaging apparatus for light speckles and a method thereof. By adapting the light-limiting module in front of the sensor, where the light-limiting module includes a plurality of light-limiting members and the light-limiting members are arranged in a one- or two-dimensional array, when the light is projected to the object surface and produce one or more rays of scattered light, by means of the light-limiting module, the plurality of rays of diffraction light is produced. Then, an array of a plurality of undistorted light speckles is produced accordingly. Finally, according to the array of the plurality of undistorted light speckles and by means of image reconstruction, a large-area and undistorted light-speckle pattern is produced. According to the present invention, the light-speckle pattern is produced according to the three-dimensional variations of the object surface. Besides, because the light-speckle pattern has the characteristic of undistortion, the light-speckle pattern given from the object surface of the moving object is undistorted, and is identical to the light-speckle pattern prior to movement. Thereby, the movement of the light-speckle pattern is clearly recognized and the movement information of the object can be given. The undistorted imagine apparatus according to the present invention can be applied to computer mice, finger guiders, smart cards, three-dimensional fingerprint identification apparatuses, a machine tool, or precise manipulator positioning systems.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. An undistorted imaging apparatus for light speckles, comprising:
a light-emitting device, emitting light to an object surface, and producing one or more rays of scattered light;
a light-limiting module, comprising a plurality of light-limiting members for limiting said one or more rays of scattered light and producing a plurality of rays of diffraction light, which interferes with each other and produces a plurality of light speckles, said plurality of light-limiting members for limiting the incident angle field of view at which said one or more rays of scattered light enter a sensor, each having a linear dimension of the field of view for an undistorted image being less than $$d_{max} \approx \frac{\lambda}{5} \cdot \frac{\gamma}{4\delta\cos^3\theta},$$

where:
$\lambda$=is the wavelength of the highly coherent light,
$2\delta$=is the average diameter of the light speckles,
$2\gamma$=is the distance between the sensor and the object surface,
$\theta$=is the angle between the optical axis of the imaging apparatus and the normal of the object surface; and
said sensor, adapted behind the light-limiting module, receiving the plurality of light speckles, and producing a light-speckle pattern according to the plurality of light speckles.

2. The undistorted imaging apparatus for light speckles of claim 1, wherein the light-emitting device is selected from the group consisting of a vertical cavity surface emitting laser (VCSEL), an edge emission laser (EEL), a highly coherent gas laser, a highly coherent solid-state laser, and a highly coherent light-emitting diode capable of emitting narrow-band light.

3. The undistorted imaging apparatus for light speckles of claim 1, wherein the plurality of light-limiting members includes a plurality of apertures and a plurality of lenses, and the plurality of apertures and the plurality of lenses are arranged in a one- or two-dimensional array, the plurality of lenses being adapted in front of the plurality of apertures, the plurality of rays of scattered light passing through the plurality of lenses and the plurality of apertures, the plurality of rays of diffraction light is produced, the plurality of light-limiting members limiting the incident angular field of view at which said one or more rays of scattered light enter the sensor, where the distance between two adjacent light-limiting members (l) of the light-limiting array module must be smaller than $d_{max}$, i.e., $$l < \frac{\lambda}{5} \cdot \frac{\gamma}{4\delta\cos^3\theta}.$$

4. The undistorted imaging apparatus for light speckles of claim 1, wherein the plurality of light-limiting members includes a plurality of apertures and a plurality of lenses, and the plurality of apertures and the plurality of lenses are arranged in a one- or two-dimensional array, the plurality of lenses being adapted behind the plurality of apertures, the plurality of rays of scattered light passing through the plurality of apertures and the plurality of lenses, the plurality of rays of diffraction light is produced, the plurality of light-limiting members limiting the incident angular field of view at which said one or more rays of scattered light enter the sensor, where the distance between two adjacent light-limiting members (l) of said light-limiting array module must be smaller than $d_{max}$, i.e., $$l < \frac{\lambda}{5} \cdot \frac{\gamma}{4\delta\cos^3\theta}.$$

5. The undistorted imaging apparatus for light speckles of claim 1, and further comprising a pre-light-limiting module, comprising a plurality of pre-light-limiting members, adapted between the object surface and the light-limiting module for limiting the secondary scattered light of said one or more rays of scattered light from entering the sensor.

6. The undistorted imaging apparatus for light speckles of claim 5, wherein the plurality of pre-light-limiting members is a plurality of pre-apertures arranged in a one- or two-dimensional array, where the distance between two adjacent pre-light-limiting members (l) of said pre-light-limiting array module must be smaller than $d_{max}$, i.e., $$l < \frac{\lambda}{5} \cdot \frac{\gamma}{4\delta\cos^3\theta}.$$

7. The undistorted imaging apparatus for light speckles of claim 1, wherein the light-limiting member includes a plurality of first apertures and a plurality of second apertures, the first apertures and the second apertures being arranged in one- or two-dimension arrays for limiting the incident angular field of view at which said one or more rays of scattered light enter the sensor, where the distance between two adjacent light-limiting members (l) of said light-limiting array module must be smaller than $d_{max}$, i.e., $$l < \frac{\lambda}{5} \cdot \frac{\gamma}{4\delta\cos^3\theta}.$$

8. The undistorted imaging apparatus for light speckles of claim 7, wherein the light-limiting member further includes a plurality of lenses adapted on one side of the plurality of first apertures and facing the plurality of second apertures, and the lenses being arranged in a one- or two-dimensional array, where the distance between two adjacent light-limiting members (l) of said light-limiting array module must be smaller than $d_{max}$, i.e., $$l < \frac{\lambda}{5} \cdot \frac{\gamma}{4\delta\cos^3\theta}.$$

9. The undistorted imaging apparatus for light speckles of claim 7, wherein the light-limiting member further includes a plurality of lenses adapted between the plurality of first apertures and the plurality of second apertures, and the lenses being arranged in a one- or two-dimensional array, where the distance between two adjacent light-limiting members (l) of said light-limiting array module must be smaller than $d_{max}$, i.e.

$$l < \frac{\lambda}{5} \cdot \frac{\gamma}{4\delta\cos^3\theta}.$$

10. The undistorted imaging apparatus for light speckles of claim 1, wherein producing a light-speckle pattern is produced by performing image reconstruction according to the array of a plurality of light speckles on the sensor.

11. The undistorted imaging apparatus for light speckles of claim 1, and the light-speckle pattern produced by the sensor being used to judge if the imaging apparatus moves with respect to the object surface.

12. The undistorted imaging apparatus for light speckles of claim 1, and further comprising a storage unit, connecting to the sensor, and storing one or more reference light-speckle patterns.

13. The undistorted imaging apparatus for light speckles of claim 12, and the one or more reference light-speckle patterns being used to judge if the light-speckle pattern produced by the sensor is identical to said one or more reference light-speckle patterns.

14. The undistorted imaging apparatus for light speckles of claim 1, wherein the object is movable.

15. The undistorted imaging apparatus for light speckles of claim 1, wherein the object remains stationary while the imaging apparatus is moved during measurement.

16. An undistorted imaging method for light speckles, comprising the steps of:
    emitting light to an object surface, and producing one or more rays of scattered light;
    limiting said one or more rays of scattered light, and producing a plurality of rays of diffraction light, wherein the step of limiting further includes the step of limiting the incident angle field of view at which said one or more rays of scattered light enter a sensor, wherein a linear dimension of the field of view for an undistorted image is in accordance with, $$d_{max} \approx \frac{\lambda}{5} \cdot \frac{\gamma}{4\delta\cos^3\theta},$$

where:
$\lambda$=is the wavelength of the highly coherent light,
$2\delta$=is the average diameter of the light speckles,
$2\gamma$=is the distance between the sensor and the object surface,
$\theta$=is the angle between the optical axis of the imaging apparatus and the normal of the object surface;
    producing an array of a plurality of light speckles owing to interference of the plurality of rays of diffraction light to each other; and
    producing a light-speckle pattern according to the array of a plurality of light speckles.

17. The undistorted imaging method for light speckles of claim 16, wherein the step of limiting said one or more rays of scattered light means limiting the incident angular field of view.

18. The undistorted imaging method for light speckles of claim 16, wherein after the step of producing one or more rays of scattered light, blocking the secondary scattered light produced by said one or more rays of scattered light from reaching the sensor.

19. The undistorted imaging method for light speckles of claim 16, and further comprising the step of judging if the imaging apparatus moves with respect to the object surface according to the light-speckle pattern.

20. The undistorted imaging method for light speckles of claim 16, and further comprising the step of reading a reference light-speckle pattern.

21. The undistorted imaging method for light speckles of claim 16, further comprising the step of judging if the light-speckle pattern is identical to the reference light-speckle pattern.

22. The undistorted imaging method for light speckles of claim 16, wherein the light is selected from the group consisting of laser light and other highly coherent light.

23. The undistorted imaging method for light speckles of claim 16, wherein the object is movable.

24. The undistorted imaging method for light speckles of claim 16, wherein the object remains stationary while the imaging apparatus is moved during measurement.

* * * * *